United States Patent Office 3,714,010
Patented Jan. 30, 1973

3,714,010
PREPARATION OF ANION EXCHANGE MEMBRANES FROM CELLULOSIC SHEETS
Adalbert Süszer, Jerusalem, Israel, assignor to the United States of America as represented by the Secretary of the Interior
No Drawing. Filed Jan. 6, 1972, Ser. No. 217,706
Int. Cl. B01d 13/02
U.S. Cl. 204—180 P
22 Claims

ABSTRACT OF THE DISCLOSURE

Anion exchange membranes can be prepared from cellulosic sheet materials such as cellophane, parchment paper, or kraft paper by impregnating the sheet with polyethyleneimine. The membrane is cross-linked at a temperature from 10 to 50° C., with a reagent selected from the group of monaldehydes, dialdehydes, reactive methylol compounds and mixtures thereof. The membrane is then quaternized. It is particularly suited for use in the electrodialytic purification of saline water.

BACKGROUND

One of the many processes which have been applied to the desalination of water, electrodialysis purifies water by taking advantage of the electrical properties of the contaminating salts. In its simplest form electrodialytic desalination is achieved by placing an electrical potential across the saline feed water so that positively charged sodium ions are attracted toward one electrode and negatively charged chloride ions are attracted toward the opposite electrode. By placing an ion exchange membrane in the water perpendicular to the current flow, ions of one particular electrical charge may be allowed to pass through while the movement of ions of the opposite charge sign is restricted. If alternating cation and anion exchange membranes are arranged in parallel to form a series of cells, the concentration of sodium and chloride ions in every other cell will increase while the concentration of these contaminants will decrease in the alternate cells. This stack arrangement of membranes is one of the most common designs for electrodialysis equipment.

It is quite apparent from this simple explanation that one of the elements vital to the efficiency and economy of such a process is the membrane, and, indeed, considerable effort has been expended to develope improved membranes. There are three properties which are important to the performance of a membrane. First, the ion exchange membrane should be selective in allowing the passage of ions of one electrical charge sign while prohibiting the flow of ions of the opposite charge. A perfectly selective membrane would allow the ions of one charge sign to pass through while completely restricting the flow of ions of the other charge. This quality is indicated by the transport number ($t$) of the membrane which represents the fraction of the total ions passing through the membrane which are ions of a particular charge. Thus, a membrane perfectly permeable to positive ions would have a $t_+$ of 1 and a $t_-$ equal to 0 indicating that all the ions passing through the membrane are positive ions. If the membrane had a $t_+$ of .8 and a $t_-$ of .2 it would indicate that 20 percent of the ions passing through the membrane are negative ions which "leak" through.

A second membrane property important to economical separation processes is the electrical resistance which is usually measured in terms of the specific resistance of the membrane per unit area. If the resistance is high, large voltages will be required to effectively operate the system and the operating cost will increase significantly. Both selectivity and resistance depend on the composition and concentration of the solutions in contact with the membrane. Finally, the membrane must meet minimal structural requirements; it must be capable of withstanding appreciable handling and duress from operation for long periods of time.

In addition, there is a fourth qualification for an anion exchange membrane, particularly when used in the electrodialytic purification of saline water. It should be resistant to fouling by negatively charged colloidal and biological materials. Since corresponding cationic pollutants are generally not present in saline waters, this fouling is peculiar to the anion exchange membranes.

One type of anion exchange membrane which has received considerable interest is based on the incorporation of an ion exchange material in a cellulosic sheet such as paper, cellophane, or parchment. One method for forming such membranes is described in U.S. Pat. No. 2,955,067. Ion exchange membranes are prepared by including the ion exchange resin in the paper pulp and subsequently forming the pulp into a sheet membrane. Although this method may be quite effective for incorporating ion exchange material throughout the entire sheet, it does have several drawbacks. First, it is possible to wash the ion exchange material from the membrane. In addition, it would be easier to form the membrane from preformed sheets rather than to go through the cumbersome procedure of preparing the sheet material as well.

A method of forming membranes from preformed cellulosic sheets is described in British Pat. No. 824,191. The sheet is impregnated with an alkylene polyamine, a polyalkylene polyamine, or a monomeric alkylene imine; it is also coated with a material such as epihalohydrin or a polyhalogen compound. The temperature is then raised, preferably to between 60 and 80° C. to react the materials and fix the polyamine in the cellulosic sheet.

Although this method provides ease in formation and by cross-linking of the polyamine prevents it from being washed from the sheet, there are still several serious problems. One of the most undesirable properties of the membranes produced by this method is that they are extremely brittle, making it difficult to handle them or to utilize them for long periods of operation. This brittleness is probably caused by the high temperature cross-linking reaction of the epihalohydrin or polyhalogenated compound with either the cellulose material or the polyethyleneimine. A product of this reaction is an acid and since cellulose is not stable to acids it deteriorates and becomes brittle.

Secondly, the process is complicated because of the utilization of organic solvent which must be recovered for reuse. This process is both difficult and dangerous. Both the solvent (methanol) and the halogenated cross-linking agents are highly toxic and must be handled with special care. Monomeric ethyleneimine utilized in some of the membranes is also particularly toxic.

It is an object, therefore, of my invention to produce an ion exchange membrane suitable for use in electrodialytic separations which meets the requirements previously outlined.

Specifically, it is an object of my invention to produce an improved anion exchange membrane from cellulosic sheet materials.

THE INVENTION

I have now discovered a new method for preparing anion exchange membranes that avoids the difficulties encountered when using the methods of the prior art. The process comprises impregnating a cellulosic sheet material with polyethyleneimine, cross-linking the polyethyleneimine at a temperature within the range of about 10 to 50° C., and, finally, quaternizing the amino and imino groups.

The cellulosic sheet materials which can be used in my invention include those generally known as parchment, cellophane and kraft paper. Parchment is a type of paper treated with concentrated sulfuric acid so that it is resistant to water and grease. Cellophane, which is produced from wood pulp by the viscous process, is transparent, flexible and resistant to grease, water and air. The third type of material, kraft paper, is available in both a paper and parchment form. Kraft paper is generally prepared by the addition of sodium sulfate to the caustic liquors in which wood chips are digested for paper preparation. It has a wide variety of uses Any of these particular materials may be used as well as other cellulose sheet materials. The choice of the particular sheet material may make a difference in the properties of the resulting membrane. For example, a comparison of membranes formed from cellophane with those of parchment paper indicates that cellophane membranes tend to have better electro-chemical properties while parchment membranes often have better mechanical properties. Parchment membranes tear less easily and have excelllent dimensional stability.

The first step in producing the membranes is to introduce the polyethyleneimine into the sheet material. This can be accomplished by immersing the sheet in an aqueous solution of this imine. Although a commercial grade of polyethyleneimine having a high molecular weight of 30,000 to 40,000 has been used in testing this process, very little difficulty has been encountered in introducing the imine into the inter fibrillar channels of the cellulosic sheets. This is probably explained by the positive charge which polyethyleneimine has and which causes it to be preferentially adsorbed by negatively charged polymers such as cellulose. Generally, it is desirable to completely saturate the sheet material with polyethyleneimine, although lesser degrees of impregnation may be used. Good membranes are produced, for example, when the nitrogen content therein is about 4.5 to 5.5 percent, corresponding to a polyethyleneimine content of about 10 to 12 percent. Complete saturation can be achieved by immersing the sheet for about 48 hours in a 30 percent aqueous solution of polyethyleneimine which is agitated and maintained at a temperature of about 60 to 80° C.

After attaining the desired degree of impregnation, the sheets are removed from the polyethyleneimine solution and excess water is removed by applying mild pressure. In the laboratory this can be achieved by lightly pressing the membrane between two sheets of filter paper. In commercial manufacture the same purpose could be achieved by passing the membrane between two padded rollers under a regulated pressure. After removal of excess water the sheets are dried at a temperature of about 20 to 30° C.

At this point the adsorbed polyethyleneimine molecules can be washed out of the sheet material with water, since the molecules are not bound to the cellulose. To prevent this the polyethyleneimine molecules are cross-linked. Unlike the method used in the prior art in which cross-linking is accomplished by reaction with a halohydrin or a polyhalo alkyl at elevated temperatures, the method used in this invention does not cause brittleness in the resulting membranes.

I have found that it is preferable to take the dried impregnated sheet and to immerse it in a solution containing a cross-linking agent selected from the group consisting of monoaldehydes, dialdehydes, reactive methylol compounds, and combinations thereof. By reactive methylol compounds I refer to those fiber active methylol compounds which react with the cellulosic sheet material by establishing a covalent ether bond between the cellulosic hydroxyl and the methylol group. For example, I have found that monoaldehydes such as formaldehyde, dialdehydes such as glyoxal and glutaraldehyde and reactive methylol compounds such as dimethylol ethylene urea, dimethylol propylene urea, and dihydroxy dimethylol ethylene urea are suitable for use as cross-linking agents. Many of these compounds are used industrially in the manufacture of crease-resistant cotton fabrics. Combinations of these cross-linking agents may also be used successfully. For example, an aqueous solution of glyoxal and formaldehyde is quite effective.

Thus, the dried polyethyleneimine-impregnated sheet is immersed in the appropriate cross-linking solution and is allowed to remain there for a sufficient time for cross-linking to occur, i.e. from about 30 minutes to several days, preferably about 16 to 18 hours. Room temperature or a temperature within the range of about 20 to 30° C. is sufficient to enable the reaction to take place. Although the actual cross-linking mechanism has not been identified, it is believed that the cross-linking agent reacts with both the hydroxyl groups in the cellulose and the amine and imine groups of the polyethyleneimine. The linkage that is formed prevents the polyethyleneimine from being washed out of the membrane.

After cross-linking the sheet is removed from the solution, washed thoroughly with cold water and allowed to dry at room temperature.

Finally, the dried, cross-linked membranes are quaternized to improve their permselectivity. Suitable quaternizing reagents include concentrated and preferably saturated solutions of methylbromide, ethylbromide, methylchloride, or ethylchloride. Appropriate solvents include nitromethane, methanol, ethanol, and other polar solvents. Quaternization is accomplished by immersing the cross-linked membrane in the quaternizing solution for about 18 to 36 hours, preferably about 24 hours. The quaternized anion-exchange membrane is then washed thoroughly with water to remove any quaternizing solution and dried at room temperature. The membrane is then ready for use.

While membranes prepared by my invention are particularly useful for the electrodialytic purification of saline water they are also useful in the electrodialytic separation of other ionic solutions and in the purification of industrial and human wastes including the electrodialytic purification of urine.

EXAMPLE 1

Membranes were prepared using cellophane sheets having a thickness of about 100 microns and parchment having a thickness between about 50 and 200 microns. Each of these sheets was immersed in a 30 percent aqueous solution of polyethyleneimine. With continuous stirring the solution was heated to between 60 and 80° C. and maintained there with continued agitation for about 48 hours. The saturated sheets were withdrawn from the solution, subjected to mild pressure between filter paper to remove the excess solution, and dried to 20 to 40° C.

The dried sheets were then immersed in an aqueous solution containing 5 percent glyoxal and about 0.25 to 0.30 percent formaldehyde. The membranes were kept in this cross-linking solution without agitation for about 17 hours. After removal from the solution, they were washed in cold water and dried at a temperature of about 20 to 40° C. Finally, the membranes were quaternized by immersion for about 24 hours in nitromethane saturated with methylbromide. The quaternized membranes were washed in cold water and were ready for use.

The membrane properties were then measured in a test cell using a .10 N solution of potassium chloride as the concentrated solution and a .05 N potassium chloride solution as the dilute solution. The properties are given in Table 1.

EXAMPLE 2

Membranes of parchment paper and cellophane were prepared exactly as in Example 1 except that the aqueous solution of glyoxal and formaldehyde was not used as the cross-linking agent. Instead, cross-linking was accomplished using a commercially available technical grade solution used in the textile industry for preparing permanent press and easy care cotton fabrics. This aqueous solution contained 25 to 50 percent dimethylol propylene urea and also a trace of free formaldehyde derived from the manufacturing process. After remaining in the solution for 16 to 18 hours the membranes were removed and treated and tested as in Example 1. Membrane properties are given in Table 1.

EXAMPLE 3

Membranes were prepared from cellophane and parchment as in Example 2 with the exception that the commercial solution used in cross-linking the membrane contained about 25 to 50 percent dimethylol ethylene urea rather than dimethylol propylene urea. The properties of the membrane were tested as in Example 1 and are reported in Table 1.

EXAMPLE 4

Membranes were prepared from cellophane and parchment as in Example 2 with the exception that the commercial solution used in cross-linking the membrane contained 25 to 50 percent dimethylol dihydroxy ethylene urea instead of dimethylol ethylene urea. The membrane properties were measured as in Example 1 and are reported in Table 1.

TABLE 2

| Thickness, mm. | Weight, g./m.² | Permselectivity[1] | Resistance, ohms/cm.² |
| --- | --- | --- | --- |
| 0.1 | 90 | .84 | 12 |
| 0.09 | 80 | .88 | 12 |
| 0.07 | 60 | .88 | 8 |
| 0.06 | 50 | .87 | 7 |
| 0.05 | 40 | .87 | 5 |

[1] Again permselectivity is reported as $E_m/E_o$. See the note in Table 1 for an explanation.

As can be seen from the data in Table 2 the thickness of the cellulosic sheet which is used may be an important variable in determining the properties of the membrane. Generally, there is no limitation on the thickness, but several important considerations must be balanced. Increased thickness in the membrane produces greater electrical resistance. This might prompt one to use the thinnest sheet material available except for the counterbalancing consideration that the membranes must be durable and strong enough to be handled and to withstand long periods of continuous operation. These and similar considerations will determine the most desirabble thickness of sheet material for a particular separation system.

I claim:

1. A method for forming an anion exchange membrane comprising the steps of:
   impregnating a cellulosic sheet material with polyethyleneimine to form a membrane,

TABLE 1

| Example | Membrane material | Cross-linking agent | Permselectivity[1] | Resistance ohms/cm.² |
| --- | --- | --- | --- | --- |
| 1 | Cellophane | Glyoxal plus formaldehyde | .90–.95 | 8–12 |
|   | Parchment | do | .84–.87 | 10–16 |
| 2 | Cellophane | Dimethylol propylene urea | .91–.93 | 8–10 |
|   | Parchment | do | .84–.86 | 10–15 |
| 3 | Cellophane | Dimethylol ethylene urea | .84–.87 | 10–12 |
|   | Parchment | do | .84 | 12–15 |
| 4 | Cellophane | Dihydroxy dimethylol ethylene urea. | .84–.87 | 10–12 |
|   | Parchment | do | .84 | 12–16 |

[1] The permselectivity reported here is the ratio of $E_m/E_o$ where $E_o$ is the voltage which theoretically would be measured across the membrane separating a .10 N solution of potassium chloride and a .05 N potassium chloride solution and $E_m$ is the actual voltage measured at the same conditions. The ratio of $E_m/E_o$ can be converted into the more commonly used term, permselectivity (t_) by the equation: $t = ((E_m/E_o)+1)/2$.

EXAMPLE 5

As an alternative, membranes were prepared from kraft paper of various thicknesses. Each of the sheets was immersed in a 30 percent aqueous solution of polyethyleneimine which with continuous stirring was heated slowly to between 60 and 80° C. The sheets were allowed to remain for 48 hours in this solution which was agitated and maintained within this temperature range. The saturated sheets were then withdrawn from solution, subjected to mild pressure between filter paper to remove excess solution, and dried at 20 to 40° C.

The dried sheets were then immersed in an aqueous solution containing 5 percent glyoxal. The sheets were kept in this cross-linking solution without agitation for about 16 to 18 hours. After removal from the solution, each sheet was washed in cold water and dried at a temperture of about 20 to 40° C. Finally, the membranes were quaternized by immersion for about 24 hours in nitromethane saturated with methylbromide. The quaternized membranes were washed in cold water and were then ready for use.

The membrane properties were then measured under the same conditions as those used in Example 1. These properties for membranes formed of kraft paper of different thicknesses are given in Table 2.

cross-linking said polyethyleneimine with an aqueous solution containing a member selected from the group consisting of monoaldehydes, dialdehydes, reactive dimethylol compounds, and mixtures thereof to form a cross-linked membrane, and
quaternizing said cross-linked membrane.

2. The method of claim 1 in which said cellulosic sheet material is selected from the group consisting of cellophane, parchment paper, and kraft paper.

3. The method of claim 2 wherein said cross-linking is accomplished at a temperature within the range of 10 to 50° C.

4. The method of claim 3 wherein said impregnating is accomplished by immersing said cellulosic sheet material in an aqueous solution of polyethyleneimine.

5. The process of claim 3 wherein said cross-linking is accomplished with an aqueous solution containing a monoaldehyde.

6. The process of claim 3 wherein said cross-linking is accomplished with an aqueous solution containing a dialdehyde.

7. The process of claim 3 wherein said cross-linking is accomplished with an aqueous solution containing a reactive methylol compound.

8. The process of claim 5 wherein said monoaldehyde is formaldehyde.

9. The process of claim 6 wherein said dialdehyde is glyoxal.

10. The process of claim 6 wherein said dialdehyde is glutaraldehyde.

11. The process of claim 7 wherein said reactive methylol compound is dimethylol ethylene urea.

12. The process of claim 7 wherein said reactive methylol compound is dimethylol propylene urea.

13. The process of claim 7 wherein said reactive methylol compound is dihydroxy dimethylol ethylene urea.

14. The process of claim 3 wherein said cross-linking is accomplished with an aqueous solution containing glyoxal and formaldehyde.

15. The process of claim 3 wherein said quaternizing is accomplished with a member of the group consisting of methylbromide, ethylbromide, methylchloride and ethylchloride.

16. The process of claim 2 wherein said cellulosic sheet material is cellophane.

17. The process of claim 2 wherein said cellulosic sheet material is parchment paper.

18. The process of claim 2 wherein said cellulosic sheet material is kraft paper.

19. The process of claim 1 wherein said anion exchange membrane is suitable for use in the electrodialytic purification of saline water.

20. In a process for the purification of saline water by electrodialysis the improvement comprising:
   using an anion exchange membrane formed by the method comprising:
   impregnating a cellulosic sheet material with polyethyleneimine to form a membrane,
   cross-linking said polyethyleneimine with an aqueous solution containing a member selected from the group consisting of monoaldehydes, dialdehydes, reactive dimethylol compounds, and mixtures thereof to form a cross-linked membrane, and
   quaternizing said cross-linked membrane.

21. The process of claim 20 in which said cellulosic sheet material is selected from the group consisting of cellophane, parchment, and kraft paper,
   said impregnating is accomplished by immersing said cellulosic sheet material in an aqueous solution of polyethyleneimine, and
   said cross-linking is accomplished at a temperature within the range of 10 to 50° C.

22. The process of claim 21 in which said cross-linking is accomplished with an aqueous solution containing glyoxal and formaldehyde.

References Cited

UNITED STATES PATENTS

| | | | |
|---|---|---|---|
| 2,223,930 | 12/1940 | Griessbach et al. | 260—2.1 |
| 2,570,822 | 10/1951 | Kressman | 260—2.1 |
| 2,677,681 | 5/1954 | Gill | 260—2.1 X |
| 3,134,740 | 5/1964 | Sheetz | 260—2.1 |
| 3,210,299 | 10/1965 | Hagge et al. | 260—2.1 |
| 3,354,103 | 11/1967 | White | 260—2.2 |
| 3,510,417 | 5/1970 | Mizutani et al. | 204—180 P |
| 3,510,418 | 5/1970 | Mizutani et al. | 204—181 |

JOHN H. MACK, Primary Examiner

A. C. PRESCOTT, Assistant Examiner

U.S. Cl. X.R.

204—296, 301; 260—2.1